United States Patent

[11] 3,588,723

| [72] | Inventor | William F. Butler |
| --- | --- | --- |
| | | Los Angeles, Calif. |
| [21] | Appl. No. | 862,752 |
| [22] | Filed | Oct. 1, 1969 |
| [45] | Patented | June 28, 1971 |
| [73] | Assignee | The United States of America as represented by the Secretary of the Navy |

[54] ENSEMBLE THRESHOLD DETECTOR
3 Claims, 6 Drawing Figs.

[52] U.S. Cl. .................................................... 329/204,
307/235, 328/150
[51] Int. Cl. ...................................................... H03d 1/10
[50] Field of Search .......................................... 329/204,
166; 307/235; 328/150; 325/477, 487

[56] References Cited
UNITED STATES PATENTS

| 3,057,995 | 10/1962 | Thaler .......................... | 325/477 |
| --- | --- | --- | --- |
| 3,348,158 | 10/1967 | Dennis .......................... | 329/204X |
| 3,493,875 | 2/1970 | Stuckert ........................ | 307/235X |

*Primary Examiner*—Alfred L. Brody
*Attorneys*—R. S. Sciascia and H. H. Losche

ABSTRACT: An ensemble threshold detector having a resistance ladder that joins a plurality of detectors to produce a weighting or averaging function to yield a smoothed estimate of the mean output for each detector which output is amplified by a circuit associated with each detector and used as a detection threshold for that detector output.

INVENTOR
WILLIAM F. BUTLER

BY H. H. Loscke

ATTORNEY

FIG. 4
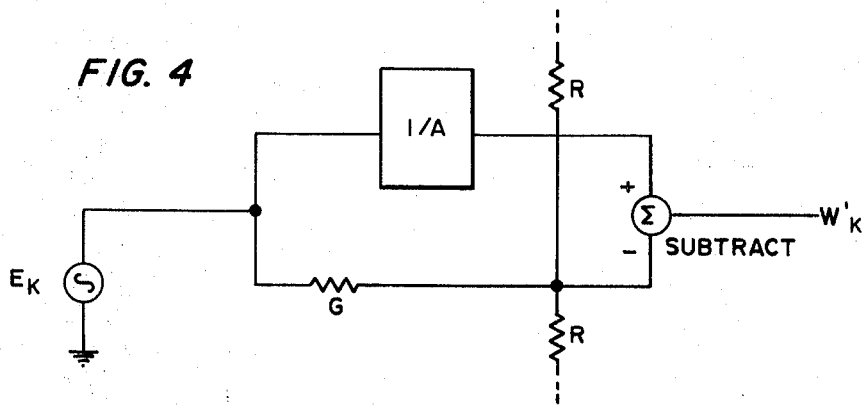
FIG. 5
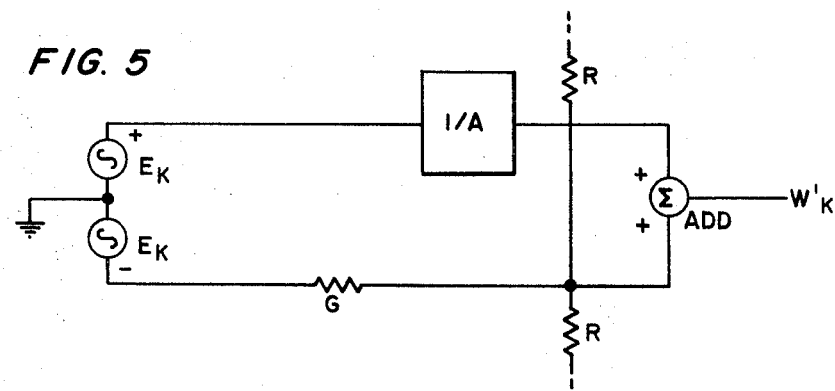
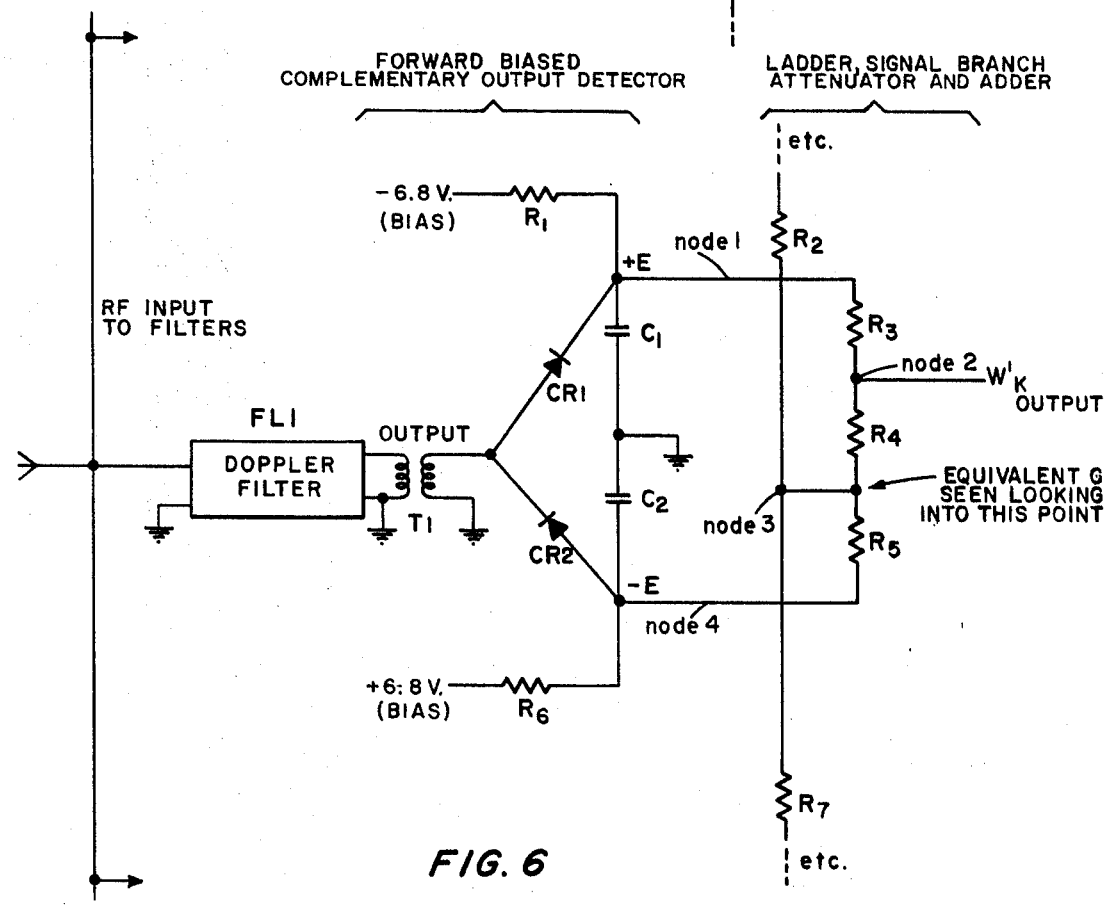
FIG. 6

ENSEMBLE THRESHOLD DETECTOR

BACKGROUND OF THE INVENTION

This invention relates to the filter and detector circuits of Doppler radar receivers and more particularly to a means for averaging voltages in a multiple channel filter bank of a Doppler receiver to produce a smoothed threshold voltage at each detector circuit in the bank of filters to permit detection of target signals and maintain a prescribed false alarm rate.

In Doppler radar systems, in which emphasis is placed on maintaining a constant false alarm rate, the detection threshold for each Doppler filter channel must vary with the noise output of the detector. A suitable method is to set the threshold proportional to the average value of the detected noise; that is, the threshold is set equal to a constant, A, times the average detector output. The selection of the value of A depends on the required false alarm rate and the output statistics of the detector, and is incidental to the present discussion. The best known prior art depended on an R-C integrator circuit to produce a smoothed threshold by averaging over the recent received signals of each channel. A Mean Level Detector (MLD) as disclosed in the U.S. Pat. No. 3,057,995 of S. Thaler employs this principle. Time averaging by an R-C integrator may be viewed as a weighting and summing operation in which the most recent input to the integrator is most heavily weighted; the weighting or contribution to the average decreases exponentially as time separation increases. The Mean Level Detector has several disadvantages that stem from the fact that the threshold for each detector is derived from its own recent history. One disadvantage is that an applied CW signal causes a threshold buildup that soon prevents detection; consequently, the radar is denied detection of targets in a lock-on mode. Another disadvantage is that an abrupt increase in noise level can result in false alarms. The ensemble averaging scheme offered here avoids these difficulties; in truth the difficulties remain but appear in a manner that is transform-related to those of the MLD.

SUMMARY OF THE INVENTION

In the invention the Ensemble Threshold detector network performs the functions of (a) Rectifying the output of each Doppler filter channel in the bank, (b) Forming an average of the rectified outputs by means of the ladder network, and (c) Using this averaging to determine a threshold voltage for each channel against which the rectified outputs are compared. Corresponding to each channel there is an output terminal on the network. The output provides the difference between the rectified (or detected) signal plus noise and the appropriate threshold. The event that the signal plus noise exceeds the threshold is thus represented by a change of sign of the output voltage. A comparator circuit, external to the network, is required to make the threshold crossing decision. In most applications the threshold comparator is time-shared between all output terminals by a sampling gate matrix of some sort. Special features of the invention, in addition to the ladder averaging network are: (a) The need for an amplifier is eliminated by substituting attenuation in one branch of the circuit in place of amplification in another branch, (b) The minimum number of resistors is used, (c) The rectifier diodes operate with forward current bias to reduce the penalizing effects of the diode potential on operating dynamic range, and (d) Post detection filtering, for cases when the filters are wider than the "matched" bandwidth, is easily incorporated. A capacitor is connected from each output terminal to ground; this capacitor is not shown in the schematic diagrams. In practice, it is desirable to employ two such ensemble networks in the filter bank. The ladder of one network connects even numbered channels and the other connects odd channels. In this way, no two adjacent channels are connected to the same averaging ladder and consequently a target signal that is straddling two channels in frequency does not doubly raise its own threshold. In this invention the resistance ladder that joins the detectors produces an average that is based on the outputs of numerous channels; this average is similar in concept to the average taken over an ensemble of voltages having the same statistics—and hence the word "ensemble" in the title. The ladder network results in a weighting function that decreases exponentially with distance along the ladder—corresponding to separation in channel frequency. It may be seen that the ladder results in a threshold voltage that receives its greatest contribution from the nearest channels in either direction—a feature not seen in the case of time averaging, which can operate on the past but not on the future. By analogy, the response of the time averaging scheme is transferred roughly to the ensemble scheme where time is replaced by frequency, except that the frequency dimension is allowed to extend in both directions and is quantized in a manner determined by the channel spacings.

BRIEF DESCRIPTION OF THE DRAWINGS

These objects, advantages, uses, and features will become more apparent to those skilled in the art as a more detailed description proceeds when considered along with the accompanying drawings in which:

FIG. 4 shows how attenuation may be used in place of amplification;

FIG. 5 shows how subtraction is replaced by addition of oppositely polarized voltages; and FIG. 6 shows a schematic of the Preferred Embodiment in which one terminal of each rectifier diode is connected to ground through the secondary of T1 allowing the use of forward current bias, through R1 or R6 to the plus or minus bias supplies and such bias extends the region of linear operation downward in voltage to values substantially less than the diode potential.

DESCRIPTION OF THE PREFERRED EMBODIMENT

Figure 1:
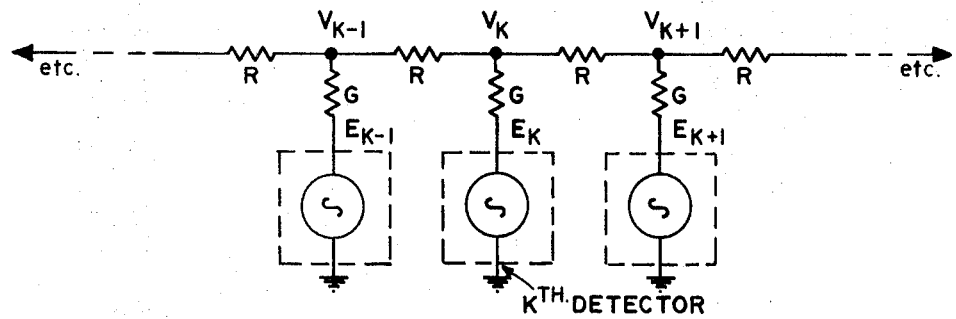
FIG. 1 is the resistance ladder that will be embedded in the detection network schematic in which the detector outputs are represented by generators.

A portion of the ladder network is shown in FIG. 1 showing three detectors as they may be coupled to a resistance ladder with resistor R therein. Each terminal point in the resistance ladder, illustrated herein as being $V_{k11}$, $V_k$, $V_{k+1}$, etc. is coupled through a resistor G to the respective detectors $E_{k11}$, $E_k$, $E_{k+1}$, etc. The output of each detector $E_{k11}$, $E_k$, and $E_{k+1}$, etc. may be represented by a fluctuating alternating current (AC) voltage component having describable statistical properties superimposed on a constant direct current (DC) voltage. The DC component of $E_k$ is the average that is to be recovered in $V_k$ with the AC component attenuated to some suitably small value. A measure of the smoothing is the amount by which the ratio of AC to DC is attenuated. The smoothing is achieved through the process of adding weighted contributions from $E_k$ and its neighboring channel outputs $E_{k+1}$, $E_{k+2}$, etc., and $E_{k11}$, $E_{k12}$, etc. The DC components add linearly and the weakly correlated AC components tend to add as the square root of the sum of squares. In the often encountered case in which the spectrum of noise applied to the Doppler filter bank is flat, the DC component of V is proportional to NE and the AC component is proportional to NE; where $\sqrt{N}$ is the effective number of channels summed by the network. The ratio of AC to DC thus decreases as $\frac{1}{\sqrt{N}}$.

Figure 2:
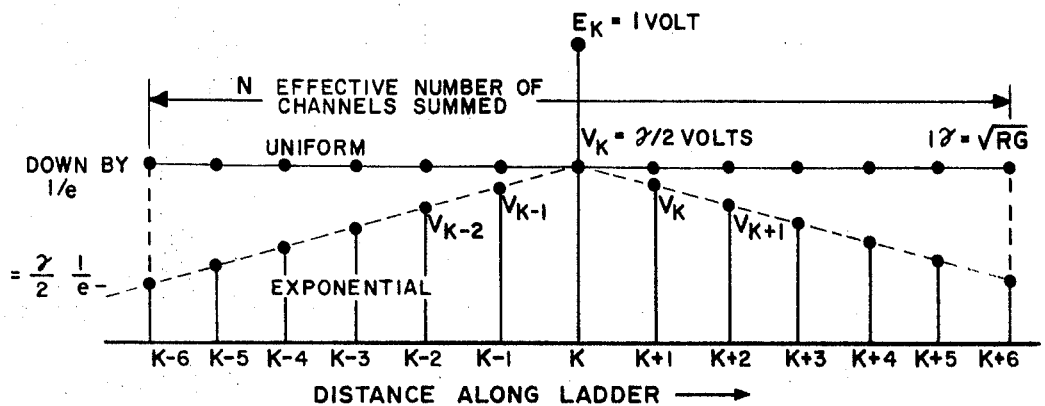
FIG. 2 is a graph showing the exponential weighting function of the resistance ladder, and, for comparison, the equivalent uniform weighting function is also shown.

FIG. 2 illustrates in graph form the exponential weighting function of the resistance ladder as well as the equivalent uniform weighting function. The graph demonstrates when $E_k=1$ volt and all other generators have zero output. Also, shown is an equivalent block of N uniformly weighted points.

Figure 3:
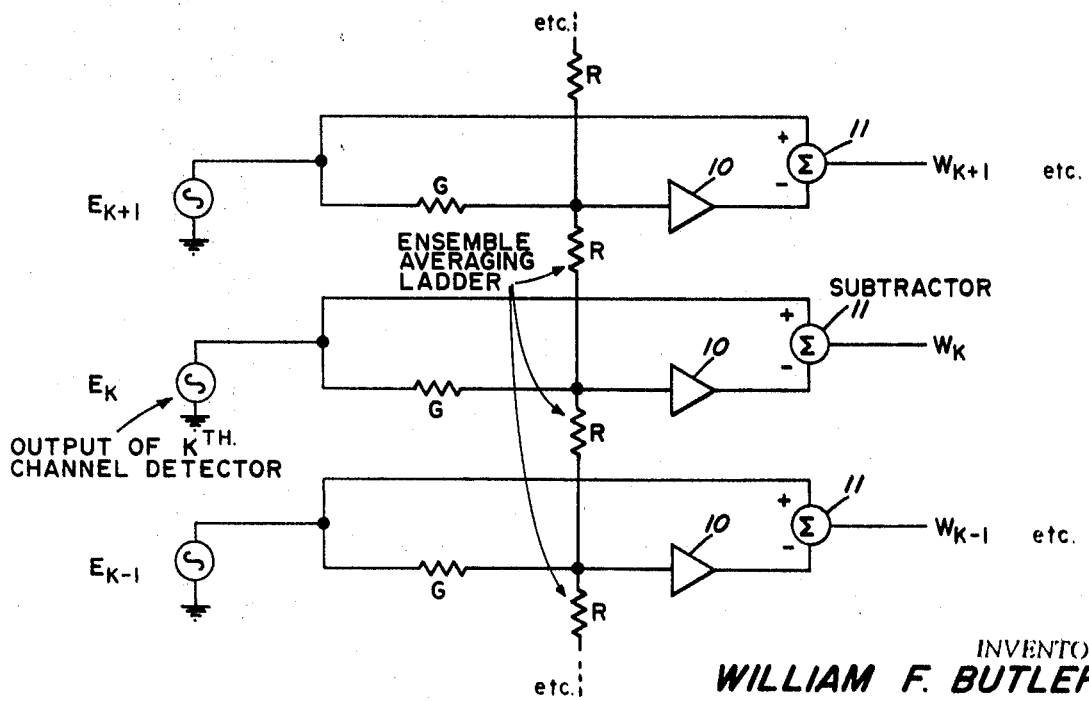
FIG. 3 shows the equivalent circuit of the detection network in which the threshold is the amplified ensemble average.

FIG. 3 illustrates an equivalent circuit of FIG 1 with amplifiers 10 and summing circuits 11 coupled to each to produce the outputs $W_{k-1}$, $W_k$, and $W_{k+1}$, etc. to threshold comparators (not shown).

FIG. 4 illustrates another embodiment in circuit schematic showing how attenuation of $\frac{1}{A}$ in the signal branch of the circuit of FIG. 3 replaces the gain of A in the threshold branch of the adder input.

FIG. 5 illustrates a still further embodiment in circuit schematic how subtraction is replaced by addition of complementary polarized detector outputs.

Referring to FIG. 6, the RF inputs are to a plurality of Doppler filters, only one, FL1, being shown with one section of the ensemble of an N filter bank since all channels are identical in circuit structure. The output of the filter FL1 is coupled through transformer T1 to the anode and cathode of rectifying diodes CR1 and CR2, respectively. The cathode of CR1 is coupled to a terminal node 1 while the anode of CR2 is coupled to a terminal node 4. Terminal node 1 and terminal node 4 are each coupled to bias voltage sources through resistors R1 and R6 and also to one plate of capacitors C1 and C2, respectively, the opposite plates being coupled to a fixed potential such as ground. Terminal node 1 is also coupled through resistors R3, R4, and R5 to the terminal node 4. A terminal node 3 at the junction of R4 and R5 connects the resistance ladder with R resistances, in this FIG. shown as resistors R2 and R7. A terminal node 2 at the junction of resistors R3 and R4 constitutes the channel output $W'_k$.

THEORY OF OPERATION a. The Ladder Network

The calculation of the weighting function, given the component values R and G, may be done by matrix methods operating on the set of current node equations for each junction point k. For analysis purposes, however, it is easier and more instructive to assume a distributed constant approximation. This approximation is effected by replacing the integer subscripts k of the node equation by the continuous variable x and representing R and G as distributed parameters:

$R = r(x)\Delta X$ and $G = g(x)\Delta X$, and then letting $\Delta X \to 0$.

The incremental quantity $\Delta X$ is the separation between nodes. Since this spacing is proportional to the frequency separation between channels we let $\Delta X = b$, the spacing bandwidth. Carrying this procedure through to obtain the weighting function for a very long ladder gives $$h(x) = \frac{\gamma}{2} e^{-\gamma |x|} \quad (1)$$

where the constant $\gamma$ is the attenuation in nepers per unit length along the ladder and is shown to be equal to $\sqrt{rg}$ and $e = 2.71828...$ the base of the natural logarithms. The voltage $V(x)$ at any point $x$ due to a distributed generator $E(x)$ is obtained by the principle of superposition and is expressed by the convolution integral:

$$V(x) = \int_{-\infty}^{\infty} E(\lambda) h(x - \lambda) d\lambda. \quad (2)$$

The results are applied to the network by quantizing what we assumed to be continuous. i.e., letting $X_k = k\Delta X$ and $E_k = E(k\Delta X)\Delta X$. etc., and we get $V_k$ by the summation $$V_K = \sum_{j=-\infty}^{\infty} E_j \frac{\gamma \Delta X}{2} e^{-\gamma \Delta X |K-j|} \quad (3)$$

$\gamma \Delta X$ is the attenuation per section $= \sqrt{r\Delta X g \Delta X} = \sqrt{RG}$. (4)

The results of calculating the attenuation by this method compared to the exact methods differ insignificantly for values of $\gamma \Delta X$ of interest. Equations (1) and (2) are sufficient to handle most of the problems pertaining to performance analysis of the ensemble averaging ladder. The similarity of $h(x)$ to the time weighting function for the R-C integrator $$h(t) = \frac{1}{\tau} e^{-t/\tau}, \; t \geq 0$$

where $\tau$ is the time constant=RC and is the reciprocal of the attenuation, in nepers, per unit time is immediately obvious. Much of what is known about time averaging can be transferred to the ensemble average upon replacing time, $t$, by the ladder position variable, $x$, which is proportional to frequency. A major difference is that $h(x)$ is double sided — it applies for $-\infty < x < \infty$ while $h(t)$ only applies for $0 \leq t$. When dealing with points near the end of the ladder, the end effects must be accounted for. Transmission line theory or the aforementioned matrix methods generally must be used in this case. Viewed as a transmission line, the ladder is best left open-circuited at its ends. The DC value, for a flat spectrum, remains constant to the end of the line since the weighting function "reflects" off of the open end with no sign reversal and thus remains normal. The threshold action is therefore not disrupted. The AC value increases since fewer independent sources are summed. At the ends, the smoothing is only $1/\sqrt{2}$ of what it would be at the center of a long ladder. For the weighting function described, the $k^{th}$ channel generator $E_k$ is weighted by amount $\frac{\gamma b}{2}$, the channel generators to either side are weighted by $\frac{\gamma b}{2} e^{-\gamma b}$; the next ones on each side by $\frac{\gamma b}{2} e^{-\gamma b}$ etc.

The question of how the attenuation factor $\gamma b$ is related to the effective number of channels N to produce a given degree of reduction in the fluctuation is answered in the following way: Assume the mean DC voltage of every channel generator is $\overline{E}$ and that the fluctuating AC components are uncorrelated from channel to channel and have each a variance $\epsilon_E^2$ (AC power). The mean voltage $V_k$, for every k, is therefore $$\overline{V} = \frac{\gamma b}{2}(\overline{E} + 2e^{-\gamma b}\overline{E} + 2e^{-2\gamma b}\overline{E} + \ldots )$$

$$= \overline{E}\frac{\gamma b}{2}\left(1 + 2\sum_{n=1}^{\infty} e^{-n\gamma b}\right)$$

$$= \overline{E}\frac{\gamma b}{2}\left(1 + 2e^{-\gamma b}\frac{1}{1 - e^{-\gamma b}}\right)$$

$$= \overline{E}\frac{\gamma b}{2}\left(\frac{1 + e^{-\gamma b}}{1 - e^{-\gamma b}}\right)$$

The variance of V is found $$\sigma_V^2 = \left(\frac{\gamma b}{2}\right)^2 [\sigma_E^2 + 2e^{-2\gamma b}\sigma_E^2 + 2e^{-4\gamma b}\sigma_E^2 + \ldots ]$$

$$= \left(\frac{\gamma b}{2}\right)^2 \sigma_E^2 \left(1 + 2\sum_{n=1}^{\infty} e^{-n\gamma b}\right)$$

$$= \sigma_E^2 \left(\frac{\gamma b}{2}\right)^2 \left(\frac{1 + (e^{-\gamma b})^2}{1 - (e^{-\gamma b})^2}\right)$$

The ratio of change of the (AC power)/(DC power) is $$\phi^2 = \frac{\left(\frac{\sigma_V^2}{\overline{V}^2}\right)}{\frac{\sigma_E^2}{\overline{E}^2}} = \frac{1 + e^{-2b\gamma}}{1 - e^{-2b\gamma}} \left(\frac{1 - e^{-b\gamma}}{1 + e^{-b\gamma}}\right)$$

Now in the limit as $b\gamma$ becomes small, the first two terms of the series expansion $e^x = 1 + x + \ldots$ may be used with the result that $$\phi^2 \simeq \frac{b\gamma}{4} = \frac{1}{N} \quad (5)$$

where $\Phi^2$ has been set equal to $\frac{1}{N}$, the "effective" number of channels described earlier. As $b\gamma$ becomes small, N becomes large — a hardly unexpected result. The above relations are used in a practical design example. Suppose the AC fluctuation power is to be attenuated by a factor of 20 (=N) and that the value of $G^{11} = 1000$ ohms.

i. The attenuation, in nepers, per channel is found from equation (5):

$$b\gamma = \frac{4}{N} = \frac{4}{20} = .2 \text{ nepers per channel}$$
$$= .2 \times 8.68 \text{ db} = 1.74 \text{ db}$$

ii. The ladder resistance R is calculated from equation (4):

$$R = G^{-1} \cdot \gamma b = 1000\Omega \times .2 = 200\Omega$$

b. Rectifier and Threshold Difference Circuits

The rectifiers and the threshold difference circuits associated with each Doppler filter channel operate in conjunction with the ladder described above to provide an output voltage at each channel that is proportional to the difference between the detected signal plus noise and a threshold voltage.

Referring to FIG. 6, the RF voltage out of the Doppler filter is rectified by CR1 and produces a voltage at node 1, denoted by +E, that is the envelope of the RF wave. Capacitor C1 is an RF bypass capacitor and is necessary to assure the rectifying action. Similarly CR2 and C2 provide an oppositely polarized envelope voltage, −E, at node 4. Resistors R1 and R6 provide forward current bias to the rectifier diodes. To understand how the threshold differencing action works, consider first the operation of the voltage divider consisting of (R3+R7) and R5 when resistors R2 and R4 are disconnected from node 3. The voltage at node 3 is proportional to E; the value of R5 is chosen to be considerably smaller than the sum of R3 and R4. The voltage at node 3 then will be negative. When noise is present at the output of the Doppler filter the voltage at node 3 will contain a fluctuating component. Resistors R2 and R7 are now connected to complete the ladder network. The effect is to stabilize the voltage at node 3; the fluctuation is reduced by the mechanism described in (a) above.

The ladder conductance G previously mentioned in (a) is the value looking into node 3 with R2 and R7 disconnected. It is convenient to assume the rectifiers appear as negligibly low impedances compared to R5 and (R3+R4), although this may not always be the case. It is calculated that $$G = \frac{1}{R5} + \frac{1}{R3+R4}$$

if the effects of the rectifiers and bias resistors is neglected. The resistance R in FIG. 1 equals the value of R2=R7. The voltage at node 2 is the output and may be thought of as the point on a voltage divider strung between a positive voltage E and a negative smoothed value $-\alpha \overline{E}$. The constant $\alpha$ is the attenuation factor $$\alpha = \frac{\frac{1}{R5} - \frac{1}{R3+R4}}{\frac{1}{R5} + \frac{1}{R3+R4}} \quad (6)$$

caused by the voltage divider action of R5 and (R3+R4) on node 3. On this basis we solve for the voltage at node 2 from the current node equations to obtain $$W = E \frac{\frac{1}{R3}}{\frac{1}{R3}+\frac{1}{R4}} - \alpha \overline{E} \frac{\frac{1}{R4}}{\frac{1}{R3}+\frac{1}{R4}} \quad (7)$$

From a systems point of view we postulate a transfer function $$W = h_o (E - A\overline{E}) \quad (8)$$

where A is the threshold-to-mean ratio that yields the prescribed false alarm rate. It is a fairly simple matter now, by comparing equations 6, 7, and 8, to solve for $h_o$ and A in terms of R3, R4, and R5. The inverse problem, that of solving for R3, R4, and R5, requires specification ion A and two other conditions. One such condition is the sum value of R3+R4+R5; this sum value directly determines the resistive component of the terminating impedance presented to the Doppler filters. To a first order approximation the termination impedance may be shown to equal (R3+R4+R5)/8.

Having described the construction and operation of my invention, I desire to be limited in the scope of my invention by the limits of the appended claims.

I claim:

1. An ensemble threshold detector circuit comprising:
   a bank of Doppler filters, each having an output, for providing a plurality of channels;
   two oppositely polarized diode rectifier circuits coupled to each Doppler filter output providing complementary replicas of the envelope of the Doppler filtered waveforms;
   a threshold differencing circuit consisting of three resistors connected in series to form a voltage divider circuit coupled across each of said two oppositely polarized diode rectifiers;
   a resistance ladder network coupled to the junction of two of said three resistors forming said threshold differencing circuit for providing a voltage representing a detection threshold voltage level associated with each respective channel in accordance with a spatial weighting function determined by the respective values of each of the resistors forming the ladder; and
   an output conductor coupled to the other junction of two of said three resistors in said voltage divider.

2. An ensemble threshold detector circuit as set forth in claim 1 wherein said ensemble resistance ladder consists of a single fourth resistor coupled to each said one juncture.

3. An ensemble threshold detector circuit as set forth in claim 2 wherein said divider network of three resistors consists of one of high resistance and two of low resistance, said two resistors of low resistance being series joined at said one juncture and said one resistance of high resistance being series joined at said other juncture.